(12) United States Patent
Koskinen et al.

(10) Patent No.: US 12,745,174 B2
(45) Date of Patent: Sep. 22, 2026

(54) ENERGY SAVING IN TELECOMMUNICATION SYSTEM

(71) Applicant: Nokia Technologies Oy, Espoo (FI)

(72) Inventors: Jussi-Pekka Koskinen, Oulu (FI); Mads Lauridsen, Aalborg (DK); Knud Knudsen, Aalborg (DK); Daniela Laselva, Aalborg (DK); Jan Torst Hviid, Aalborg (DK)

(73) Assignee: Nokia Technologies Oy, Espoo, FL (US)

( * ) Notice: Subject to any disclaimer, the term of this patent is extended or adjusted under 35 U.S.C. 154(b) by 403 days.

(21) Appl. No.: 18/481,468

(22) Filed: Oct. 5, 2023

(65) Prior Publication Data

US 2024/0121713 A1 Apr. 11, 2024

(30) Foreign Application Priority Data

Oct. 6, 2022 (GB) ..................................... 2214662

(51) Int. Cl.
*H04W 52/02* (2009.01)
*H04W 68/02* (2009.01)
*H04W 68/06* (2009.01)

(52) U.S. Cl.
CPC ... *H04W 52/0229* (2013.01); *H04W 52/0245* (2013.01)

(58) Field of Classification Search
None
See application file for complete search history.

(56) References Cited

U.S. PATENT DOCUMENTS

2013/0265914 A1* 10/2013 Ahn .......................... H04L 5/14 370/280
2018/0310249 A1 10/2018 Wilhelmsson et al.
(Continued)

FOREIGN PATENT DOCUMENTS

WO 2018/075939 A1 4/2018
WO 2018/175760 A1 9/2018
(Continued)

OTHER PUBLICATIONS

"3rd Generation Partnership Project; Technical Specification Group Radio Access Network; Study on support of reduced capability NR devices (Release 17)", 3GPP TR 38.875, V17.0.0, Mar. 2021, pp. 1-135.

(Continued)

*Primary Examiner* — San Htun
(74) *Attorney, Agent, or Firm* — Lippes Mathias LLP

(57) ABSTRACT

In some examples, user equipment comprises a processor, a memory coupled to the processor, the memory configured to store program code executable by the processor, the program code comprising one or more instructions, whereby to cause the user equipment to measure a parameter associated with a radio coverage of a network node for the user equipment, on the basis of the value of the parameter, transmit information to the network node representing a reception status of a wake-up receiver of the user equipment, and on the basis of the reception status of the wake-up receiver of the user equipment monitor a selected paging signal from one of multiple paging signals transmitted by the network node.

20 Claims, 3 Drawing Sheets

(56) References Cited

U.S. PATENT DOCUMENTS

| | | | | |
|---|---|---|---|---|
| 2019/0150114 | A1* | 5/2019 | Liu | H04W 48/16 370/252 |
| 2019/0223105 | A1 | 7/2019 | Wilhelmsson et al. | |
| 2020/0107267 | A1 | 4/2020 | Wu et al. | |
| 2020/0221408 | A1* | 7/2020 | Lee | H04J 11/0076 |
| 2020/0229095 | A1 | 7/2020 | Shrestha et al. | |
| 2021/0014825 | A1* | 1/2021 | Shi | H04W 52/0229 |
| 2021/0092679 | A1* | 3/2021 | Åström | H04W 52/0206 |
| 2021/0337474 | A1 | 10/2021 | Astrom et al. | |
| 2022/0030439 | A1 | 1/2022 | Taherzadeh Boroujeni et al. | |
| 2022/0295398 | A1* | 9/2022 | Hwang | H04W 52/0229 |
| 2023/0164732 | A1* | 5/2023 | Lee | H04L 5/0053 455/456.1 |

FOREIGN PATENT DOCUMENTS

| | | | |
|---|---|---|---|
| WO | 2018/192746 | A1 | 10/2018 |
| WO | 2018/200575 | A1 | 11/2018 |
| WO | 2019/122515 | A1 | 6/2019 |
| WO | 2019/208989 | A1 | 10/2019 |
| WO | 2020/225031 | A1 | 11/2020 |

OTHER PUBLICATIONS

"New SID: Study on low-power Wake-up Signal and Receiver for NR", 3GPP TSG RAN meeting #94e, RP-213645, Agenda: 8A.1, vivo, Dec. 6-17, 2021, 4 pages.

"Motivation for new study item on ultra-low power wake up signal in Rel-18", 3GPP TSG RAN Rel-18 workshop, RWS-210168, Agenda: 4.3, vivo, Jun. 28-Jul. 2, 2021, 13 pages.

"3rd Generation Partnership Project; Technical Specification Group Radio Access Network; NR; Radio Resource Control (RRC) protocol specification (Release 17)", 3GPP TS 38.331, V17.1.0, Jun. 2022, pp. 1-1273.

"3rd Generation Partnership Project; Technical Specification Group Radio Access Network; NR; Physical layer procedures for control (Release 17)", 3GPP TS 38.213, V17.2.0, Jun. 2022, pp. 1-256.

"3rd Generation Partnership Project; Technical Specification Group Radio Access Network; NR; User Equipment (UE) procedures in Idle mode and RRC Inactive state (Release 17)", 3GPP TS 38.304, V17.1.0, Jun. 2022, pp. 1-50.

"3rd Generation Partnership Project; Technical Specification Group Radio Access Network; NR; NR and NG-RAN Overall Description; Stage 2 (Release 17)", 3GPP TS 38.300, V17.1.0, Jun. 2022, pp. 1-209.

"System support for Wake Up Signal", 3GPP TSG-RAN WG2 Meeting #110-e, R2-2005932, Huawei, Jun. 1-12, 2020, 4 pages.

Search Report received for corresponding United Kingdom Patent Application No. 2214662.5, dated Mar. 24, 2023, 4 pages.

Extended European Search Report received for corresponding European Patent Application No. 23197601.0, dated Feb. 19, 2024, 8 pages.

* cited by examiner

ENERGY SAVING IN TELECOMMUNICATION SYSTEM

TECHNICAL FIELD

The present disclosure relates, in general, to enhancements in relation to energy savings of user equipment in radio networks.

BACKGROUND

Some devices, such as those without a continuous energy source, e.g., user equipment (UE) using small rechargeable and non-rechargeable single coin cell batteries that can be used for vertical use cases (including sensors and actuators that are deployed extensively for monitoring, measuring, charging, etc.), wearable devices such as smart watches, rings, medical monitoring devices and so on, can have battery lifetime targets of up to years. Such UE can comprise machine-type communication (MTC) devices and narrow band internet of things (NB-IOT) devices for example.

Some of these UE types (e.g., sensors, actuators and wearables) requiring a long battery life can be employed for latency-critical services (such as sensors for fire detection and extinguishing, and so on). Accordingly, solutions (such as, e.g., eDRX) which enable the periodicity at which the UE wakes up to monitor for a paging signal to be extended, which in turn reduces its average power consumption are not applicable as they would lead to unacceptable communication latency.

SUMMARY

An objective of the present disclosure is to provide a mechanism to enable UE supporting and configured with a low-power Wake-up receiver to indicate to a network, e.g., via a node, whether the UE is in WUS coverage.

The foregoing and other objectives are achieved by the features of the independent claims.

Further implementation forms are apparent from the dependent claims, the description and the Figures.

A first aspect of the present disclosure provides user equipment, comprising a processor, a memory coupled to the processor, the memory configured to store program code executable by the processor, the program code comprising one or more instructions, whereby to cause the user equipment to measure a parameter associated with a radio coverage of a network node for the user equipment, on the basis of the value of the parameter, transmit information to the network node representing a reception status of a wake-up receiver of the user equipment, and on the basis of the reception status of the wake-up receiver of the user equipment monitor a selected paging signal from one of multiple paging signals transmitted by the network node.

In an implementation of the first aspect, the program code can comprise one or more further instructions, whereby to cause the user equipment to monitor one of a wake-up signal transmitted from the network node and a Downlink Control Information based paging signal transmitted from the network node. The program code can comprise one or more further instructions, whereby to cause the user equipment to receive feedback information from the network node on the basis of the reception status of the wake-up receiver, and on the basis of the feedback information, select a paging signal from one of multiple paging signals transmitted by the network node to monitor. The program code can comprise one or more further instructions, whereby to cause the user equipment to measure at least one of a Reference Signal Received Power, a Received Signal Strength Indicator, and a Reference Signal Received Quality associated with a wake-up signal of the network node, and/or a wake-up signal beacon of the network node. The program code can comprise one or more further instructions, whereby to cause the user equipment to determine, on the basis of the value of the parameter, whether a threshold is met, and if the threshold is met, trigger transmission of the information representing a reception status of a wake-up receiver of the user equipment. The program code can comprise one or more further instructions, whereby to cause the user equipment to receive information representing a value of the threshold from the network node. The program code can comprise one or more further instructions, whereby to cause the user equipment to transmit the message as part of one of an RRC Setup message, an RRC Resume message, transmitted to the network node. The program code can comprise one or more further instructions, whereby to cause the user equipment to receive a message from the network node indicating confirmation of the reception capability of a wake-up receiver of the user equipment.

A second aspect of the present disclosure provides a method for advertising a reception status of a wake-up receiver of a user equipment, the method comprising measuring a parameter associated with a radio coverage of a network node for the user equipment, on the basis of the value of the parameter, transmitting information to the network node representing a reception status of a wake-up receiver of the user equipment, and on the basis of the reception status of the wake-up receiver of the user equipment, monitoring a selected paging signal from one of multiple paging signals transmitted by the network node.

In an implementation of the second aspect, the method can further comprise monitoring one of a wake-up signal transmitted from the network node and a Downlink Control Information based paging signal transmitted from the network node. The method can further comprise receiving feedback information from the network node on the basis of the reception status of the wake-up receiver, and on the basis of the feedback information, selecting a paging signal from one of multiple paging signals transmitted by the network node to monitor.

A third aspect of the present disclosure provides a node in a radio network, comprising a processor, a memory coupled to the processor, the memory configured to store program code executable by the processor, the program code comprising one or more instructions, whereby to cause the node to configure a set of conditions relating to radio coverage and a transmission mechanism for a wake-up signal transmitted by the node for a wake-up receiver of user equipment, and receive a message representing a reception status of the wake-up receiver of the user equipment.

In an implementation of the third aspect, the program code can comprise one or more further instructions, whereby to cause the node to transmit at least one of a secondary synchronization signal, a wake-up signal and a wake-up beacon. The program code can comprise one or more further instructions, whereby to cause the node to transmit a message for the user equipment configured to regulate a wake-up signal monitoring status of the user equipment. The program code can comprise one or more further instructions, whereby to cause the node to receive a Physical Random Access Channel message comprising an indication of a change in reception capability of the wake-up receiver of the user equipment. The program code can comprise one or more further instructions, whereby to cause the node to transmit feedback information on the basis of the reception status of the wake-up receiver. The program code can comprise one or more further instructions, whereby to cause the node to transmit information representing a value of a threshold relating to a parameter associated with a radio coverage of the node. The program code can comprise one or more further instructions, whereby to cause the node to receive the message as part of one of an RRC Setup message or an RRC Resume message. The program code can comprise one or more further instructions, whereby to cause the node to transmit a message indicating confirmation of the reception capability of a wake-up receiver of the user equipment.

A fourth aspect of the present disclosure provides a method, performed in a node of a radio network, the method comprising configuring a set of conditions relating to radio coverage and a transmission mechanism for a wake-up signal transmitted by the node for a wake-up receiver of user equipment, and receiving a message representing a reception status of the wake-up receiver of the user equipment.

In an implementation of the fourth aspect, the method can further comprise transmitting at least one of a secondary synchronization signal, a wake-up signal, a wake-up beacon, and a Downlink Control Information based paging signal. The method can further comprise transmitting a message for the user equipment configured to regulate a wake-up signal monitoring status of the user equipment. The method can further comprise receiving a Physical Random Access Channel message comprising an indication of a change in reception capability of the wake-up receiver of the user equipment. The method can further comprise transmitting feedback information on the basis of the reception status of the wake-up receiver. The method can further comprise transmitting information representing a value of a threshold relating to a parameter associated with a radio coverage of the node.

These and other aspects of the invention will be apparent from the embodiment(s) described below.

BRIEF DESCRIPTION OF THE DRAWINGS

In order that the present invention may be more readily understood, embodiments of the invention will now be described, by way of example, with reference to the accompanying drawings, in which.

DETAILED DESCRIPTION

Figure 1:
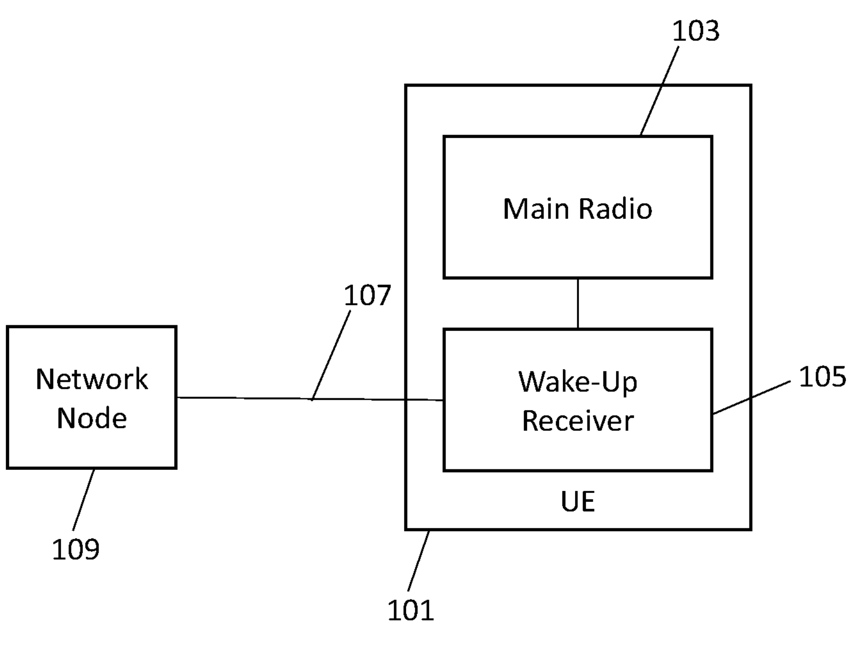
FIG. 1 is a schematic representation of a UE according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe example embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof. The term "and/or" is only an association relationship for describing associated objects and represents that three relationships may exist such that A and/or B may indicate that A exists alone, A and B exist at the same time, or B exists alone. The character "I" generally represents that the associated objects are in an "or" relationship.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

The phrases "in one implementation," or "in some implementations," may each refer to one or more of the same or different implementations. The term "coupled" is defined as connected whether directly or indirectly through intervening components and is not necessarily limited to physical connections. The expression "at least one of A, B and C" or "at least one of the following: A, B and C" means "only A, or only B, or only C, or any combination of A, B and C."

The terms "system" and "network" may be used interchangeably.

For the purposes of explanation and non-limitation, specific details such as functional entities, techniques, protocols, and standards are set forth for providing an understanding of the present disclosure. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof A software implementation may include machine- and/or computer-readable and/or executable instructions stored on a machine- and/or computer-readable medium such as memory or other types of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

The fifth generation (5G) New Radio (NR) system is designed to provide flexibility and configurability to optimize network services and types, accommodating various use cases. A radio communication network architecture such as a Long-Term Evolution (LTE) system, an LTE-Advanced (LTE-A) system, an LTE-Advanced Pro system, or a 5G NR Radio Access Network (RAN) typically includes at least one base station (BS), at least one user equipment (UE), and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, a MTC device, a NB-IOT device, or a Personal Digital Assistant (PDA) with wireless communication capability. The UE is configured to receive and transmit signals over an air interface to one or more cells in a RAN.

A BS can provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

A BS may include but is not limited to a node B (NB) in the UMTS, an evolved node B (eNB) in LTE or LTE-A, a radio network controller (RNC) in UMTS, a BS controller (BSC) in the GSM/GERAN, a next generation (ng)-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. A BS may serve one or more UEs via a radio interface.

A BS can provide radio coverage to a specific geographical area using a plurality of cells forming the RAN. The BS supports the operations of the cells. Each cell is operable to provide services to at least one UE within its radio coverage.

Each cell (often referred to as a serving cell) can provide services to serve one or more UEs within its radio coverage such that each cell schedules the downlink (DL) and optionally uplink (UL) resources to at least one UE within its radio coverage for DL and optionally UL packet transmissions. The BS can communicate with one or more UEs in the radio communication system via the plurality of cells.

A wake-up signal (WUS) can be used for, e.g., MTC and NB-IOT devices. The WUS is part of a mechanism used to reduce power consumption of a UE in a radio resource control (RRC) idle mode. In this context, aside from a main radio apparatus of a UE, which is used for full power communications with a radio network, a secondary radio apparatus can be provided as part of the UE. The main radio of the UE can be in a sleep mode (or even powered off) to enable power saving and can be activated only upon the reception of a WUS received by the secondary radio (or wake-up receiver) from the network. As such, the network triggers the UE to wake-up when needed in an event-driven manner by transmitting a special WUS to the UE, which is monitored by the dedicated low-power wake-up receiver at the UE.

When a UE receives the WUS, the wake-up receiver can trigger the wake-up of the ordinary NR transceiver and communication can start (e.g., regular paging monitoring by the UE). Thus, an ultra-low power receiver can be used to wake up the main radio of the UE. Otherwise, the main radio is OFF or kept in a deep sleep mode. The low-power wake-up receiver can be operated in an always 'on' manner with very low power consumption.

FIG. 1 is a schematic representation of a UE according to an example. In the example of FIG. 1, UE 101 comprises a main radio apparatus 103 and a wake-up receiver 105. The wake-up receiver can receive a WUS 107 from a network node 109. Upon receipt of the signal 107, the wake-up receiver can trigger the main radio apparatus 103 to wake up from an, e.g., RRC idle state, in order to commence full communication with the network.

However, there is a trade-off between the power consumption and the RF sensitivity (coverage) of the wake-up receiver 105 as its sensitivity is significantly worse than the main (e.g., LTE/WIFI) receiver 103. For example, according to RWS-210168, the main radio apparatus 103 in NR idle can have an RF sensitivity of around −100 dBm associated with an average power consumption of 30-50 mW. A low power wake-up receiver 105 (an almost zero power receiver using a passive circuit with envelope detector for example) can have an RF sensitivity of around −70 to −90 dBm with an average power consumption of 7.4 nW. Accordingly, there is more than 100× power saving, but at the cost of significant sensitivity degradation.

It is therefore apparent that the cell size (coverage area) of a network node can differ by significant amounts for the low-power WUS and legacy DCI-based paging. Specifically, the WUS coverage area of a network node 109 will be smaller than the entire cell area in which legacy DCI-based paging is supported. This is due to the reduced sensitivity of the wake-up receiver 105, and furthermore due to use of different modulation/coding and potentially different carrier frequencies for the WUS compared to that of legacy paging.

Figure 2:
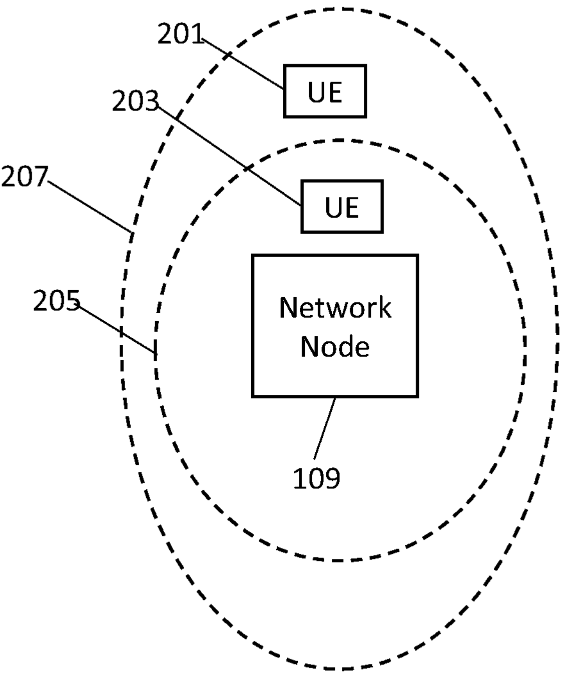
FIG. 2 is a schematic representation of a network node according to an example.

FIG. 2 is a schematic representation of a network node according to an example. In the example of FIG. 2, a UE 201 near the cell edge of the node 109 is only able to receive legacy paging, while a UE 203 closer to the cell centre can receiver both WUS and legacy paging as a result of the difference in coverage areas for WUS paging (coverage area 205) and legacy DCI-based paging (coverage area 207). In such scenarios, the NW cannot know if a WUS can be used. That is, the NW is not able to determine whether a UE is within the coverage area 205 or not.

According to an example, UE 101 supporting and configured with a low-power Wake-up receiver 105 can indicate to the NW, e.g., via a node 109, whether the UE is in WUS coverage 205 or not. For example, UE 101 can send a notification to the node 109 to indicate whether the UE 101 is in the coverage area 205 of a WUS or not, and/or whether the UE 101 moves out/in of the WUS coverage area 205.

RSRP/RSSI/RSRQ based conditions can be configured for triggering the notification. When a condition is met or not (entry/exit), the UE can report this to the NW. Conditions may be related to one or more of the following: WUS RSSI/RSRP or WUS beacon RSSI/RSRP or legacy RRM measurements (RSRP/RSRQ) based on SSS. It will be appreciated that RSSI/RSRP are examples for measurements (or metrics) that can be used to represent a WUS signal level and other metrics may be used.

In one example, UE is informed about the potential sensitivity offset between the legacy measurement and WUS. Accordingly, the NW knows whether the UE is in the coverage area of a WUS or not and can schedule a WUS only when needed (e.g., when the UE is monitoring it) making NW energy and resource saving possible. Furthermore, UE signalling of WUS/paging DCI coverage status/change can be limited to reduce energy consumption and signalling overhead.

In an example, a UE can send a notification to a network node indicating a change of its monitoring status, such as whether the UE has started monitoring for a WUS or has started monitoring for legacy paging (e.g., DCI/PDCCH) signals. The UE can be in an IDLE/INACTIVE state and can initiate an RRC Setup procedure or RRC Resume (for SDT or non-SDT) procedure if the WUS coverage status changes (to in-coverage or to out-of-coverage) so that the WUS coverage change notification can be transmitted to the network. Notifications can be based on, e.g., PHY, MAC or RRC signaling. For example, MAC CE or RRC measurement reports, UE Assistance Information or new information can be used for such notifications and can be transmitted in, e.g., an RRC Setup Request and/or an RRC Resume Request.

In an example, random access resources (e.g., PRACH preambles, PRACH occasions) can be reserved for indicating a WUS coverage status or a WUS coverage status change, or a change of UE monitoring status from paging DCI to WUS or vice versa. For example, certain RA resources can be assigned for in-coverage notification or for notifying a change to a WUS monitoring status, and certain RA resources can be assigned for an out-of-coverage notification or for notifying a change of UE monitoring status from WUS to paging DCI. Accordingly, the NW is able to determine the UEs WUS coverage status and monitoring type from the used RA resources.

For RRC Connected UEs, Contention Free-RACH can be used, allowing for UE identification by the network based on the received PRACH resource. For RRC Idle/Inactive UEs, PRACH resources for the notification can be associated with WUS occasions. Furthermore, these PRACH resources can be assigned per WUS group in a WUS occasion. Within a WUS occasion, multiple WUS can be configured targeting different WUS groups. In an example, the NW may respond to the reception of a PRACH indicating, e.g., "monitoring status changed to WUS" with a special Msg2 of 4-step Random Access indicating ACK. For the connected mode, such a Msg2 can target the identified UE, whereas for idle/inactive such a Msg2 can target all UEs in the identified WUS group.

In an example, a UE can start monitoring for a WUS or a paging DCI signal according to the indicated information. In another example, a NW response/confirmation can be required before the UE starts WUS monitoring.

In an example, notification transmissions can be limited to avoid excessive signaling and/or any negative impact on UE power consumption. This can be achieved with a prohibit timer or by using hysteresis values for determining WUS or paging DCI coverage for example, including asymmetric hysteresis and timers enabling the UE to move to regular paging DCI monitoring but not to WUS monitoring unless, e.g., RSRP improves by a predetermined amount.

In an example, a UE can transmit a notification only if it enters a WUS area (i.e., the UE would like to stop monitoring paging DCI unless it receives a WUS to save energy). In this case, synchronization with the network can be performed to ensure UE reachability, i.e., the network can be informed that the UE has switched to WUS monitoring to enable it to start transmitting WUS (+DCI) for the UE.

In an example, a UE can transmit a notification only if it leaves a WUS area (i.e., the UE needs to monitor paging DCI instead, because it cannot receive a WUS). If the UE enters the WUS area of a node, the notification need not be transmitted and the UE can continue paging DCI monitoring. In a further example, the UE can switch to WUS monitoring after having received an RRC Connection or RAN notification area update or registration area update in which the UE could potentially indicate the change of monitoring.

In an example, a notification can be limited to avoid excessive signaling according to one or more of the following UE conditions: for stationary or low mobility devices only, when a 'not-at-cell-edge' condition is fulfilled, a low mobility condition is fulfilled, a stationary condition is fulfilled, UE is in low mobility state, the UE has not changed a cell in last x seconds/minutes/hours, RSRP/RSRQ measurement results of serving/neighbor cells remains stable, i.e., with margin+/−x dBs. In an example, a UE can avoid performing RSRP/RSRQ measurements while monitoring for a WUS in order to save energy. Thus, the UE can either refrain from signaling or measure received power of a WUS instead.

The examples above are applicable to one or more of the following RRC states: IDLE, INACTIVE, CONNECTED.

Figure 3:
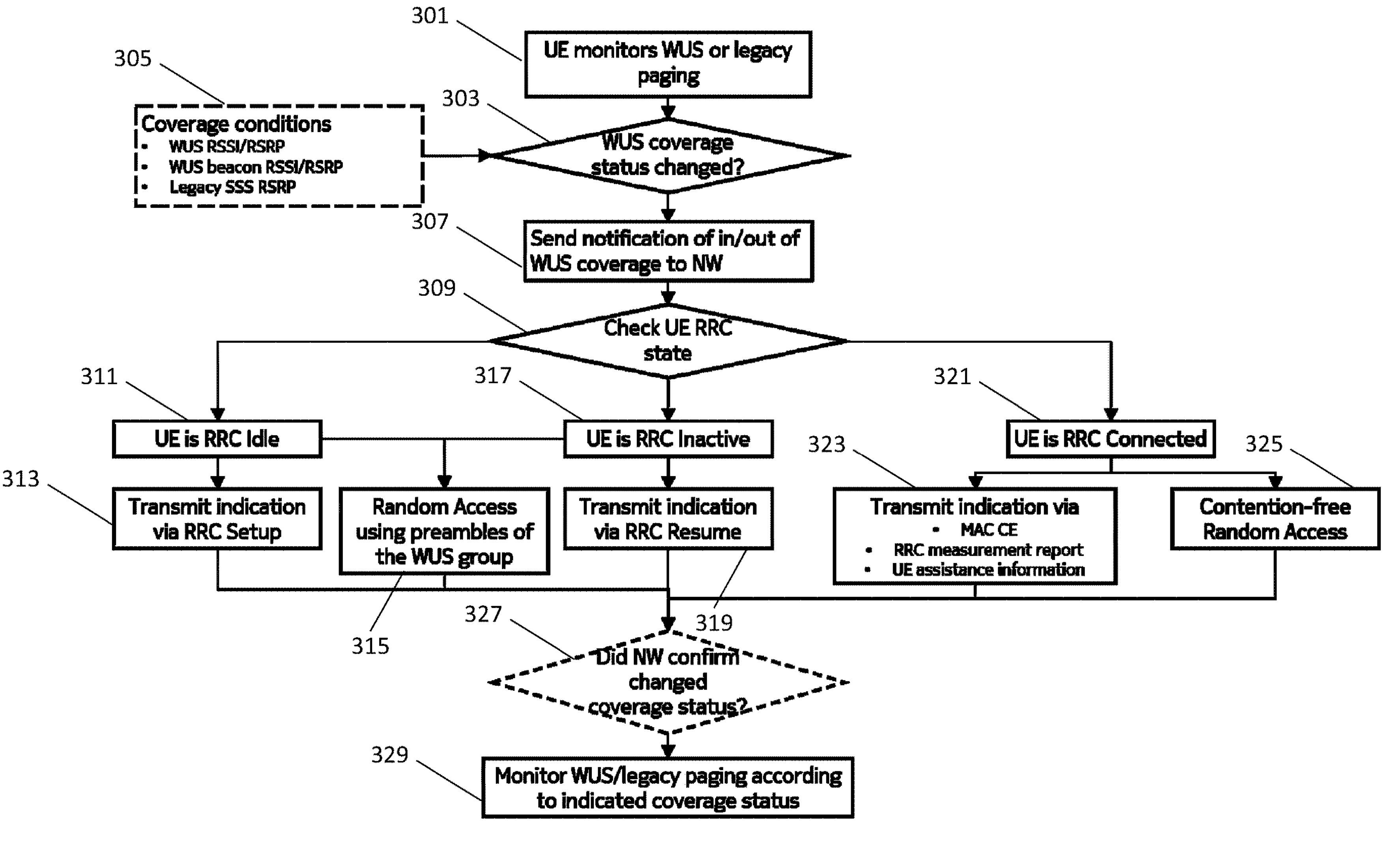
FIG. 3 is a flow chart of a method according to an example.

FIG. 3 is a flow chart of a method according to an example. In block 301, a UE 101 can be within a coverage area of a network node 109 such that it can monitor for either a WUS or for a legacy paging signal. In block 303, the UE 101 can determine whether its WUS coverage status has changed, e.g., due to mobility and after having passed into or out of a coverage area 205. The UE 101 can measure a parameter 305 associated with a radio coverage of the network node 109. In an example, a parameter can comprise one or more of a Reference Signal Received Power, a Received Signal Strength Indicator, and a Reference Signal Received Quality. In block 307, on the basis of the value of the parameter 305, the UE 101 can transmit information to the network node 109 representing a reception status of the wake-up receiver 105. That is, in an example, the UE 101 can transmit information to the network node 109 representing whether it is within or outside of the WUS coverage area 205 of the node 109. The manner or mechanism in which the information is provided to the node 109 depends, in an example, on the RRC state of the UE. Accordingly, in order to inform the mechanism by which the notification of block 307 is provided, in block 309, the RRC state of the UE is determined. If the UE is in an RRC idle state (block 311), the notification can be provided as part of an RRC setup in block 313, and random-access resources can be used (block 315) as described above. If the UE is in an RRC inactive state (block 317), the notification can be provided as part of an RRC resume in block 319, and random-access resources can be used (block 315) as described above. If the UE is in an RRC connected state (block 321), contention Free-RACH can be used (block 325), allowing for UE identification by the network based on the received PRACH resource.

In an example, in block 327, the node can respond to confirm the change in coverage status. In block 329, the UE can monitor for a WUS or for legacy paging according to the coverage status of the wake-up receiver. That is, on the basis of the reception status of the wake-up receiver of the user equipment, a selected paging signal from one of multiple paging signals transmitted by the network node can be monitored.

According to an example, information regarding a potential sensitivity offset between a legacy measurement and a WUS can be provided to the UE by higher (UE) layers based on, e.g., pre-production measurements, or by learning/measuring during "live" operation. For example, UE can measure a WUS beacon RSRP then a legacy RSRP and compare the values, from which the offset can be determined.

Figure 4:
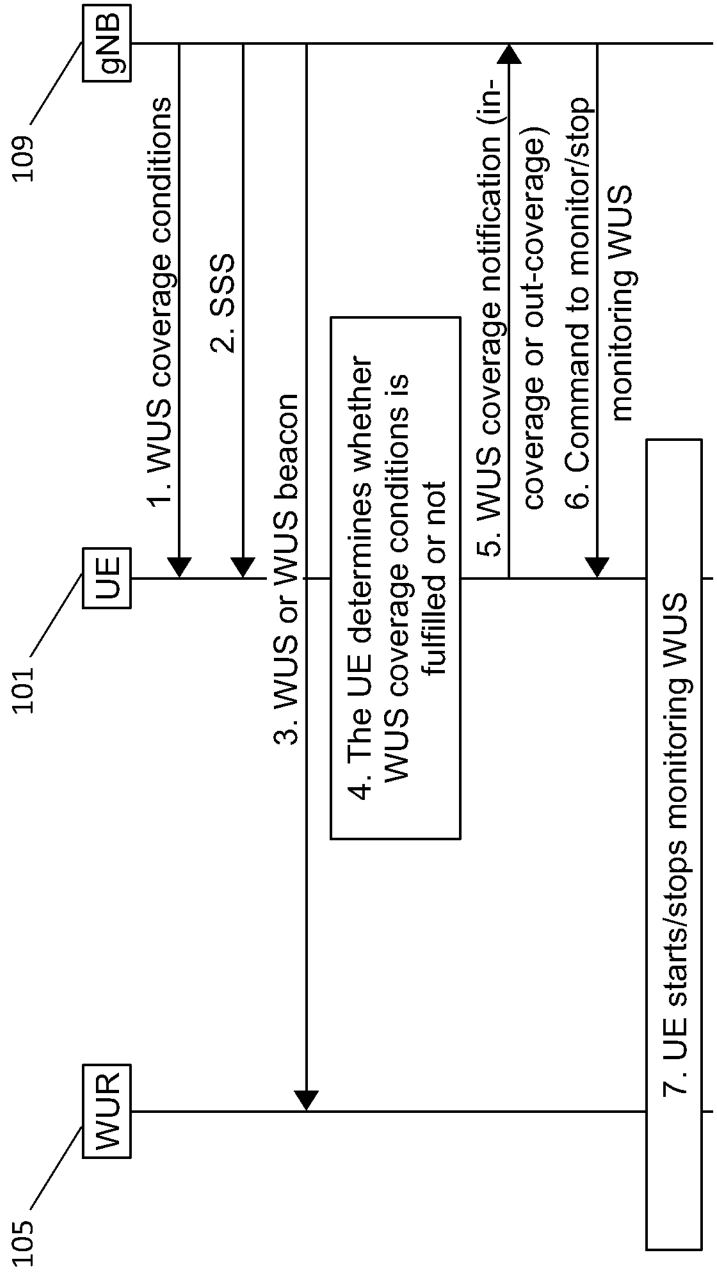
FIG. 4 is a schematic representation of a method according to an example.

FIG. 4 is a schematic representation of a method according to an example. A NW node 109 configures (1) WUS coverage conditions using dedicated and/or broadcast signalling. Conditions, represented by one or more parameters associated with a radio coverage of the node 109 may be related to one or more of the following: WUS RSSI/RSRP or WUS beacon RSSI/RSRP or legacy RRM measurements (RSRP/RSRQ) based on Secondary Synchronization Signal (SSS). In an example, UE 101 can be informed by the UE 109 about the potential sensitivity offset between the legacy measurement and WUS, determined as described above. The UE 101 measures the SSS (2). This is optional, and measurements can be related to SSS or WUS/WUS beacon or both. The UE 101 measures (3) the WUS or WUS beacon as received at the wake-up receiver 105 of the UE 101. This is optional, and measurements can be related to SSS or WUS/WUS beacon or both. The UE 101 determines (4) whether a WUS coverage condition is fulfilled or not based on the conditions received in 1 and optionally using measurements from 2 and 3. The UE 101 transmits (5) a WUS coverage notification indication to the node 109. This is optional, i.e., the UE 101 can change its monitoring status without the indication. In one example, the UE sends a notification to network indicating the change of its monitoring status, i.e., whether the UE is starting monitoring of WUS or starting monitoring of legacy paging DCI/PDCCH.

In an example the UE 101 can report measured results of WUS RSSI/RSRP or WUS beacon RSSI/RSRP or legacy RRM measurements (RSRP/RSRQ) based on SSS. In an example, the UE 101 can send a notification to the node 109 indicating a change of its monitoring status, i.e., whether the UE is starting monitoring of WUS or starting monitoring of legacy paging DCI/PDCCH.

In an example, when the UE 101 is in an IDLE/INACTIVE state, it can initiate an RRC Setup procedure or an RRC Resume (for SDT or non-SDT) procedure if the WUS coverage status changes (to in-coverage or to out-of-coverage) so that the WUS coverage change notification can be transmitted to the network. With reference to block 323 of FIG. 3, these notifications can be, e.g., PHY, MAC or RRC signalling. For example, MAC CE or RRC measurement reports, UE Assistance Information or new information can be used for such notifications and can be transmitted, e.g., in an RRC Setup Request and/or an RRC Resume Request.

In an example, random access resources (e.g., PRACH preambles, PRACH occasions) can be reserved for indicating the WUS coverage status or a WUS coverage status change, or a change of UE monitoring status from paging DCI to WUS or vice versa. For example, certain RA resources can be assigned for in-coverage notification or for notifying a change to a WUS monitoring status, and certain RA resources can be assigned for out-of-coverage notifications or for notifying a change of a UE monitoring status from WUS to paging DCI.

In an example, the NW is able to determine the UEs WUS coverage status and monitoring type from the RA resources used. For example, for RRC Connected UEs, Contention Free-RACH can be used, allowing for UE identification by the network based on the received PRACH resource. For RRC Idle/Inactive UEs, PRACH resources for the notification can be associated with WUS occasions. Furthermore, these PRACH resources can be assigned per WUS group in a WUS occasion. Note that within a WUS occasion, multiple WUS could be configured targeting different WUS groups.

In an example, node 109 can command the UE to start/stop monitoring WUS. In one example, the UE can change the WUS monitoring status without such a command from the network. In one example, the NW may respond to the reception of a PRACH indicating "monitoring status changed to WUS" with a special Msg2 of 4-step Random Access indicating ACK. For connected mode, such Msg2 would target the identified UE, whereas for idle/inactive, such Msg2 would target all UEs in the identified WUS group. The UE 202 can start/stop WUS monitoring (7) based on the determination in 4 and/or the WUS monitoring command in 5.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

The invention claimed is:

1. An apparatus, comprising:

at least one processor; and at least one memory including computer program code, wherein the at least one memory and the computer program code are configured to, with the at least one processor, cause the apparatus at least to:

measure a parameter associated with a radio coverage of a network node for the apparatus;

receive, from the network node, information regarding a sensitivity offset between a legacy measurement and a wake-up signal measurement, wherein a wake-up receiver of the apparatus has a lower receiver sensitivity than a main receiver of the apparatus used for legacy paging;

receive, from the network node, a value of a threshold relating to the parameter;

determine, on the basis of the value of the parameter, the sensitivity offset, and the threshold, whether the apparatus is within or outside of a wake-up signal coverage area of the network node, wherein the wake-up signal coverage area is smaller than a legacy paging coverage area of the network node due to the lower receiver sensitivity of the wake-up receiver;

on the basis of a determination that the apparatus has transitioned into or out of the wake-up signal coverage area, transmit information to the network node representing a reception status of the wake-up receiver of the apparatus, the reception status indicating whether the apparatus is within or outside of the wake-up signal coverage area, transmission of the information being limited by at least one of a prohibit timer or hysteresis values to avoid excessive signaling; and on the basis of a response from the network node to the reception status of the wake-up receiver of the apparatus, monitor a selected paging signal from one of multiple paging signals transmitted by the network node.

2. The apparatus as claimed in claim 1, wherein the at least one memory and the computer program code are further configured to, with the at least one processor, cause the apparatus at least to:

receive feedback information from the network node on the basis of the reception status of the wake-up receiver; and on the basis of the feedback information, select a paging signal from one of multiple paging signals transmitted by the network node to monitor.

3. The apparatus as claimed in claim 1, wherein the at least one memory and the computer program code are further configured to, with the at least one processor, cause the apparatus at least to:

trigger the transmission of the information representing the reception status upon one of:

the value of the parameter crossing the threshold indicating the apparatus has entered the wake-up signal coverage area; or the value of the parameter crossing the threshold indicating the apparatus has exited the wake-up signal coverage area.

4. The apparatus as claimed in claim 1, wherein the at least one memory and the computer program code are further configured to, with the at least one processor, cause the apparatus at least to:

receive a message from the network node indicating confirmation of the reception status of the wake-up receiver of the apparatus.

5. A method, comprising:

measuring a parameter associated with a radio coverage of a network node for a user equipment;

receiving, from the network node, information regarding a sensitivity offset between a legacy measurement and a wake-up signal measurement, wherein a wake-up receiver of the user equipment has a lower receiver sensitivity than a main receiver of the user equipment used for legacy paging;

receiving, from the network node, a value of a threshold relating to the parameter;

determining, on the basis of the value of the parameter, the sensitivity offset, and the threshold, whether the user equipment is within or outside of a wake-up signal coverage area of the network node, wherein the wake-up signal coverage area is smaller than a legacy paging coverage area of the network node due to the lower receiver sensitivity of the wake-up receiver;

on the basis of a determination that the user equipment has transitioned into or out of the wake-up signal coverage area, transmitting information to the network node representing a reception status of the wake-up receiver of the user equipment, the reception status indicating whether the user equipment is within or outside of the wake-up signal coverage area, transmission of the information being limited by at least one of a prohibit timer or hysteresis values to avoid excessive signaling; and on the basis of a response from the network node to the reception status of the wake-up receiver of the user equipment, monitoring a selected paging signal from one of multiple paging signals transmitted by the network node.

6. The method as claimed in claim 5, further comprising:

receiving feedback information from the network node on the basis of the reception status of the wake-up receiver; and on the basis of the feedback information, selecting a paging signal from one of multiple paging signals transmitted by the network node to monitor.

7. An apparatus comprising:

at least one processor; and at least one memory including computer program code, wherein the at least one memory and the computer program code are configured to, with the at least one processor, cause the apparatus at least to:

configure a set of conditions relating to radio coverage and a transmission mechanism for a wake-up signal transmitted by the apparatus for a wake-up receiver of a user equipment, wherein a wake-up signal coverage area of the apparatus is smaller than a legacy paging coverage area due to a lower receiver sensitivity of the wake-up receiver compared to a main receiver of the user equipment;

transmit information regarding a sensitivity offset between a legacy measurement and the wake-up signal;

transmit information representing a value of a threshold relating to a parameter associated with a radio coverage of the apparatus;

transmit at least one of a secondary synchronization signal, a wake-up signal, a wake-up beacon, and a downlink control information based paging signal;

receive a message representing a reception status of the wake-up receiver of the user equipment, the reception status indicating whether the user equipment is within or outside of the wake-up signal coverage area based on the sensitivity offset and the threshold, the message received as part of one of a radio resource control setup message, a radio resource control resume message, or a physical random access channel message comprising an indication of a change in reception capability of the wake-up receiver of the user equipment;

on the basis of the reception status, select whether to page the user equipment using a wake-up signal or a downlink control information based paging signal;

transmit feedback information on the basis of the reception status of the wake-up receiver;

transmit a message for the user equipment configured to regulate a wake-up signal monitoring status of the user equipment; and transmit a message indicating confirmation of the reception status of the wake-up receiver of the user equipment.

8. The apparatus as claimed in claim 1, wherein the at least one memory and the computer program code are further configured to, with the at least one processor, cause the apparatus at least to:

transmit the information representing the reception status using reserved random access resources, wherein certain random access resources are assigned for an in-coverage notification indicating the apparatus is within the wake-up signal coverage area and certain random access resources are assigned for an out-of-coverage notification indicating the apparatus is outside the wake-up signal coverage area.

9. The apparatus as claimed in claim 8, wherein the random access resources are assigned per wake-up signal group in a wake-up signal occasion, and wherein within the wake-up signal occasion multiple wake-up signals are configured targeting different wake-up signal groups.

10. The apparatus as claimed in claim 9, wherein:

the apparatus is in one of a radio resource control idle state or a radio resource control inactive state;

transmission of the information representing the reception status is limited by a prohibit timer to avoid excessive signaling;

the at least one memory and the computer program code are further configured to, with the at least one processor, cause the apparatus at least to:

transmit the information representing the reception status via a physical random access channel preamble assigned to a wake-up signal group of the apparatus from among a plurality of wake-up signal groups, the physical random access channel preamble specifically indicating a change in monitoring status to wake-up signal monitoring, wherein within a wake-up signal occasion multiple wake-up signals are configured targeting different ones of the plurality of wake-up signal groups;

receive, in response to the transmission, a special message 2 of a 4-step random access procedure indicating an acknowledgment of the change in monitoring status, wherein the special message 2 targets all user equipment in the wake-up signal group of the apparatus; and upon receipt of the special message 2, transition to monitoring for a wake-up signal instead of a paging downlink control information signal.

11. The apparatus as claimed in claim 8, wherein a physical random access channel preamble space is partitioned in a cell based on wake-up signal capability, wherein user equipment with wake-up signal capability uses a first partition and user equipment without wake-up signal capability uses a second partition.

12. The apparatus as claimed in claim 1, wherein when the apparatus is in a radio resource control connected state, the at least one memory and the computer program code are further configured to, with the at least one processor, cause the apparatus at least to:

transmit the information representing the reception status using contention-free random access, allowing for identification of the apparatus by the network node based on a received physical random access channel resource.

13. The apparatus as claimed in claim 12, wherein the at least one memory and the computer program code are further configured to, with the at least one processor, cause the apparatus at least to:

receive, in response to transmitting the information representing a change in monitoring status via the contention-free random access, a message 2 of a random access procedure indicating an acknowledgment, wherein the message 2 targets the apparatus based on the physical random access channel resource used by the apparatus.

14. The apparatus as claimed in claim 1, wherein the at least one memory and the computer program code are further configured to, with the at least one processor, cause the apparatus at least to:

determine whether the apparatus has transitioned into or out of the wake-up signal coverage area using asymmetric hysteresis values, wherein the asymmetric hysteresis values enable the apparatus to transition to paging downlink control information monitoring but not to wake-up signal monitoring unless a reference signal received power improves by a predetermined amount.

15. The apparatus as claimed in claim 1, wherein the at least one memory and the computer program code are further configured to, with the at least one processor, cause the apparatus at least to:

measure the parameter using a separate measurement object defined to measure a wake-up receiver signal or a wake-up signal, distinct from measurement objects used for legacy radio resource management measurements.

16. The apparatus as claimed in claim 1, wherein the at least one memory and the computer program code are further configured to, with the at least one processor, cause the apparatus at least to:

transmit the information representing the reception status via one or more of a medium access control control element, a radio resource control measurement report, or user equipment assistance information.

17. The apparatus as claimed in claim 1, wherein the at least one memory and the computer program code are further configured to, with the at least one processor, cause the apparatus at least to:

transmit the information representing the reception status only upon one of:

entering the wake-up signal coverage area, to indicate the apparatus would like to monitor for a wake-up signal instead of paging downlink control information; or leaving the wake-up signal coverage area, to indicate the apparatus needs to monitor for paging downlink control information instead of a wake-up signal.

18. The apparatus as claimed in claim 1, wherein the at least one memory and the computer program code are further configured to, with the at least one processor, cause the apparatus at least to:

switch to wake-up signal monitoring after having performed one of a radio resource control connection procedure, a radio access network notification area update procedure, or a registration area update procedure.

19. The apparatus as claimed in claim 1, wherein transmission of the information representing the reception status is limited to all of the following conditions being satisfied:

the apparatus is a stationary device or a low mobility device;

a not-at-cell-edge condition is fulfilled;

the apparatus has not changed a cell within a predetermined time period; and a reference signal received power measurement or a reference signal received quality measurement of serving and neighbor cells remains stable within a predetermined margin.

20. The method as claimed in claim 5, further comprising: transmitting the information representing the reception status using reserved random access resources, wherein certain random access resources are assigned for an in-coverage notification indicating the user equipment is within the wake-up signal coverage area and certain random access resources are assigned for an out-of-coverage notification indicating the user equipment is outside the wake-up signal coverage area.

* * * * *